US008968913B2

(12) United States Patent
Rosskamp et al.

(10) Patent No.: US 8,968,913 B2
(45) Date of Patent: Mar. 3, 2015

(54) RECHARGEABLE BATTERY PACK FOR AN ELECTRICAL LOAD

(71) Applicant: Andreas Stihl AG & Co. KG, Waiblingen (DE)

(72) Inventors: Heiko Rosskamp, Adelberg (DE); Gernot Liebhard, Waiblingen (DE); Henrik Gaul, Schorndorf (DE); Volker Reber, Michelbach (DE); Joachim Kolb, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 13/726,363

(22) Filed: Dec. 24, 2012

(65) Prior Publication Data

US 2013/0164600 A1    Jun. 27, 2013

(30) Foreign Application Priority Data

Dec. 22, 2011   (DE) .......................... 10 2011 122 058

(51) Int. Cl.
*H01M 6/42*    (2006.01)
*H01M 2/20*    (2006.01)
*H01M 10/04*   (2006.01)
(Continued)

(52) U.S. Cl.
CPC .............. *H01M 2/202* (2013.01); *H01M 2/204* (2013.01); *H01M 10/0481* (2013.01); *H01M 10/0525* (2013.01); *H01M 10/488* (2013.01)
USPC ........................................................ 429/159

(58) Field of Classification Search
CPC ... Y02E 60/12; Y02E 60/122; Y02T 10/7005; H01M 10/0525; H01M 10/052; H01M 10/425; H01M 10/482; H01M 10/5004; H01M 2/1077; H01M 2/202; H01M 2/204
USPC ........................................................ 429/159
See application file for complete search history.

(56) References Cited

U.S. PATENT DOCUMENTS

| 5,818,201 A | 10/1998 | Stockstad et al. |
| 6,331,764 B1 | 12/2001 | Oglesbee et al. |
| 6,627,345 B1 * | 9/2003 | Zemlok et al. .................. 429/99 |

(Continued)

FOREIGN PATENT DOCUMENTS

WO   WO 02/30631 A2   4/2002

OTHER PUBLICATIONS

European Search Report of the European Patent Office dated Mar. 8, 2013 in the corresponding European patent application EP12008362.

*Primary Examiner* — Stewart Fraser
(74) *Attorney, Agent, or Firm* — Walter Ottesen P.A.

(57) ABSTRACT

The invention is directed to a rechargeable battery pack for an electrical load with the load being connected to the rechargeable battery pack by a connection cable. A housing of the rechargeable battery pack has an inner space for accommodating a large number of rechargeable individual cells which are electrically connected to one another and supply the load via the connection cable. To provide the housing with a high level of stability, provision is made for the receiving space in the housing to be subdivided into individual receptacles by partition walls. A cell pack includes a predefined number of the individual cells and is arranged in a corresponding individual receptacle. Each cell pack forms an independent unit which is held in the individual receptacle. The individual cells of a cell pack are electrically and mechanically connected to one another by cell connectors.

23 Claims, 9 Drawing Sheets

(51) Int. Cl.
*H01M 10/0525* (2010.01)
*H01M 10/48* (2006.01)

(56) References Cited

U.S. PATENT DOCUMENTS

| | | | |
|---|---|---|---|
| 6,841,291 B2 | 1/2005 | Minamiura | |
| 7,073,614 B2* | 7/2006 | Saito et al. | 180/8.6 |
| 7,498,774 B2 | 3/2009 | Ziegler et al. | |
| 7,553,583 B2 | 6/2009 | Eaves | |
| 7,592,773 B2* | 9/2009 | Pellenc | 320/114 |
| 8,058,842 B2* | 11/2011 | Kai et al. | 320/116 |
| 8,410,756 B2* | 4/2013 | Sakakibara et al. | 320/118 |
| 8,691,412 B2* | 4/2014 | Yonishi | 429/100 |
| 2004/0050595 A1* | 3/2004 | Saito et al. | 180/8.1 |
| 2004/0138785 A1 | 7/2004 | Emori et al. | |
| 2005/0057221 A1 | 3/2005 | Desilvestro et al. | |
| 2007/0108944 A1* | 5/2007 | Pellenc | 320/130 |
| 2008/0050645 A1* | 2/2008 | Kai et al. | 429/61 |
| 2010/0123434 A1 | 5/2010 | Iwata | |
| 2010/0181966 A1* | 7/2010 | Sakakibara | 320/136 |
| 2010/0221590 A1* | 9/2010 | Reber | 429/99 |
| 2010/0221591 A1* | 9/2010 | Ro kamp et al. | 429/99 |
| 2010/0320969 A1* | 12/2010 | Sakakibara et al. | 320/118 |
| 2010/0321025 A1 | 12/2010 | Lin et al. | |
| 2011/0003182 A1 | 1/2011 | Zhu | |
| 2011/0068744 A1 | 3/2011 | Zhu | |
| 2011/0074354 A1 | 3/2011 | Yano | |
| 2011/0097619 A1* | 4/2011 | Park | 429/159 |
| 2011/0248675 A1 | 10/2011 | Shiu et al. | |
| 2011/0287287 A1* | 11/2011 | Kang | 429/82 |
| 2013/0162052 A1 | 6/2013 | Gaul et al. | |
| 2013/0162055 A1* | 6/2013 | Reber et al. | 307/150 |
| 2013/0162217 A1 | 6/2013 | Gaul et al. | |
| 2013/0163135 A1 | 6/2013 | Liebhard | |

* cited by examiner

RECHARGEABLE BATTERY PACK FOR AN ELECTRICAL LOAD

CROSS REFERENCE TO RELATED APPLICATION

This application claims priority of German patent application no. 10 2011 122 058.9, filed Dec. 22, 2011, the entire content of which is incorporated herein by reference.

FIELD OF THE INVENTION

The invention relates to a rechargeable battery pack for an electrical load, in particular for a portable, electrical work apparatus.

BACKGROUND OF THE INVENTION

Rechargeable battery-operated work apparatus are increasingly being used in the private and professional fields. Powerful rechargeable batteries such as chemically lithium-based rechargeable batteries have a high energy density, and therefore even more demanding work can be carried out with electric work apparatus over a relatively long period of time. Rechargeable battery-operated hedge trimmers, rechargeable battery-operated power saws and rechargeable battery-operated brush cutters are known, these having a rechargeable battery pack which is inserted into the housing of the work apparatus.

If a great deal of work is to be carried out with brush cutters or hedge trimmers, relatively large rechargeable battery packs have to be used in order to achieve long operating times, these rechargeable battery packs predominantly being carried by the user separately from the electric working device. In this case, a connection cable connects the rechargeable battery pack being carried by the user to the electrical load in the work apparatus. Rechargeable battery packs of this kind are heavy and therefore have to be arranged in a stable housing. Stable housings are usually heavy and significantly increase the weight of the rechargeable battery pack which is heavy in any case; however, relatively lightweight housings are susceptible to damage, for example if the rechargeable battery pack topples over when it is placed on the ground or if the rechargeable battery pack falls to the ground when it is removed from the back of the user.

SUMMARY OF THE INVENTION

It is an object of the invention to provide a rechargeable battery pack for an electrical load in such a way that a lightweight, robust housing for the rechargeable battery pack is formed.

The rechargeable battery pack of the invention is for an electric load and includes: a connecting cable; a multiplicity of rechargeable individual cells which are electrically interconnected and configured to feed the electric load via the connecting cable; a housing having a receiving space configured, for accommodating the multiplicity of cells; partitioning walls configured to subdivide the receiving space into individual receptacles; the multiplicity of individual cells being apportioned into a plurality of cell packs wherein each one of the cell packs contains a predetermined number of the individual cells; the cell packs defining respective independent components configured to be held, in corresponding ones of the receptacles; a plurality of cell connectors assigned to corresponding ones of the cell packs; and, each one of the cell connectors being configured to electrically interconnect the individual cells of the cell pack to which the one connector is assigned.

According to the invention, the receiving space for the individual cells of the rechargeable battery pack is subdivided into individual receptacles by partition walls. A cell pack having individual cells is arranged in an individual receptacle, with each cell pack forming an independent unit which is held in the individual receptacle. In this case, the individual cells of a cell pack are electrically and mechanically connected to one another by cell connectors. The partition walls advantageously run approximately parallel to the lateral housing walls and, in particular, approximately orthogonally to the main panel.

Forming the individual receptacles within the housing of the rechargeable battery pack results in a brace which forms a stable mechanical structure of the housing of the rechargeable battery pack. As a result, the housing can be formed from a lightweight material, for example plastic or the like, without the strength of the housing being reduced.

Partitioning into individual receptacles also has the advantage that an identical housing can be used for rechargeable battery packs of different designs. For example, the maximum number of individual cells can be incorporated in one cell pack, for example 15; however, cell packs with fewer individual cells down to just one individual cell within a cell pack can be formed. Since the individual receptacles are mechanically separated from the other individual receptacles, the housing of the rechargeable battery pack can also be provided with just two or three cell packs if, for example, lower powers are required. The versatility of the housing and the usefulness thereof is increased by the division according to the invention into individual receptacles for cell packs.

A cell pack is advantageously secured in an individual receptacle by engagement elements of the housing which project into the outer contour of the cell pack. The cell pack cannot move in its individual receptacle, but rather is fixed in its position in the individual receptacle by the engagement elements, so that a cell pack can be oriented at approximately the same distance, for example all the way around, from the partition walls.

The partition walls of the individual receptacles extend approximately over the entire height of a cell pack, and therefore each cell pack is mechanically completely separated from the other cell packs, thus increasing the safety of the entire rechargeable battery pack.

The individual receptacles are advantageously formed in a main body of the rechargeable battery pack, in particular on the back panel of the rechargeable battery pack, with the main panel of the housing, together with the base panel, forming the L-shaped main body which delimits the receiving space of the rechargeable battery pack. This receiving space can be closed by a housing cover.

The partition walls which are provided in the rechargeable battery pack for forming the individual receptacles include a first vertical section, which is formed on the main panel or the back panel, and a second vertical section which is formed in the housing cover. As a result, it is easier to access the cell pack when the housing cover is removed.

A cell pack is held in an oriented manner in the individual receptacle by supports which are provided on the base of an individual receptacle. The supports can be used to compensate for height differences in the base region and the cell pack can be positioned in an oriented manner. Supports which correspond to those of the main housing are also advantageously provided in the housing cover of the rechargeable battery housing, and therefore a rechargeable battery pack is also held between supports, preferably without play.

The partition walls in the housing of the rechargeable battery pack are formed by a common rib which extends from one narrow side of the housing to the opposite narrow side of the housing. In this case, it is practical to form an elastic deformation zone in the longitudinal direction of a partition wall, the deformation zone acting as a damper and absorber when forces are active. The deformation zone approximately includes a corrugated or S-shaped wall section which can form, in particular, an engagement element of the housing; the engagement element engages in a recess in the cell pack, which recess is formed in the outer contour, and secures the cell pack against movement in the individual receptacle.

In an embodiment of the invention, the partition wall in the housing of the rechargeable battery pack which runs from one longitudinal side to the other longitudinal side is interrupted. The partition wall is purposefully interrupted at the level of each individual receptacle. A cutout, which serves to guide electrical lines, is formed by the interruption. After the electrical line is laid, this cutout can be closed by a slide which, at the same time, serves as a holding element for wiring.

The partition wall in the housing of the rechargeable battery pack is advantageously connected to the narrow sides of the housing by means of an arcuate connection section which is partially cylindrical in section. The partially cylindrical connection section, which is symmetrical in relation to the partition wall, serves, similarly to the deformation zone, as a damper and absorber for active forces. Cutouts for further guiding electrical cables are advantageously provided in the edge of the partially cylindrical connection section.

In an embodiment of the invention, an electrical terminal box is provided in the housing of the rechargeable battery pack. The electrical terminal box is purposefully arranged at that end of the housing which is opposite the base panel. As a result, the terminal box is provided, in the upper end region of the main panel (back panel) and the space saved in the base region can be occupied by cell packs. As a result, the center of gravity of the rechargeable battery pack falls in the direction of the base of the housing, this being advantageous for a user in respect of ergonomics.

BRIEF DESCRIPTION OF THE DRAWINGS

The invention will now be described with reference to the drawings wherein.

DESCRIPTION OP THE PREFERRED EMBODIMENTS OF THE INVENTION

Figure 1:
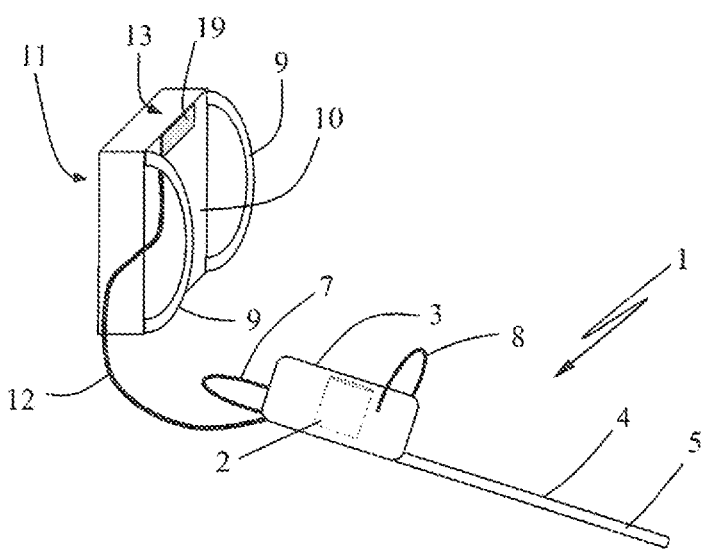
FIG. 1 shows a schematic illustration of an electric working device having a backpack-type rechargeable battery pack.

The rechargeable battery pack 10 illustrated in detail in FIGS. 2 to 13 is provided for an electric working device 1, as illustrated in FIG. 1 by way of example. In the exemplary embodiment shown, the working device is an electric hedge trimmer having an electric drive motor 2 which forms an electrical load 3. The electric drive motor 2 of the illustrated working device 1 is arranged on one end of a blade bar 4 which has two blades 5 which move back and forth as the tool. The housing of the working device 1 has one grip as the front handle 8 and a further grip as the rear handle 7, a user holding and guiding the electrical working device 1 by means of these handles. The rechargeable battery pack 10 is provided for the purpose of supplying power to the electrical load 3, the rechargeable battery pack being in the form of a backpack-type unit 11 and being secured to the back of a user by carrying straps 9. The rechargeable battery pack 10 is connected to the electrical load 3 of the working device 1 by means of an electrical connection cable 12, with the connection cable 12 being connected in a terminal box 13 by way of a connection plug 27 on the side of the rechargeable battery pack 10.

A blower device, a motor-operated chainsaw, a brush cutter, a pruner or similar device can also be connected to the rechargeable battery pack 10 as the working device instead of a hedge trimmer.

The housing 14 of the rechargeable battery pack 10 is designed as a unit 11 (FIG. 1) which is separated from the electrical load 3 and substantially includes a main plate which is in the form of a back panel 16 (FIG. 3) which faces the back of a user. The back panel 16 is approximately at a right angle to a base 17 (FIG. 7), and therefore the main body 15 of the housing 14 has an approximate L shape. The base 17 is provided with a rib arrangement 50 (FIG. 11) on its housing outer face, and therefore the base 17 itself as a shaped body forms a stable stand 70 for the rechargeable battery pack 10, by way of which stand it can be securely placed on the ground.

Figure 3:
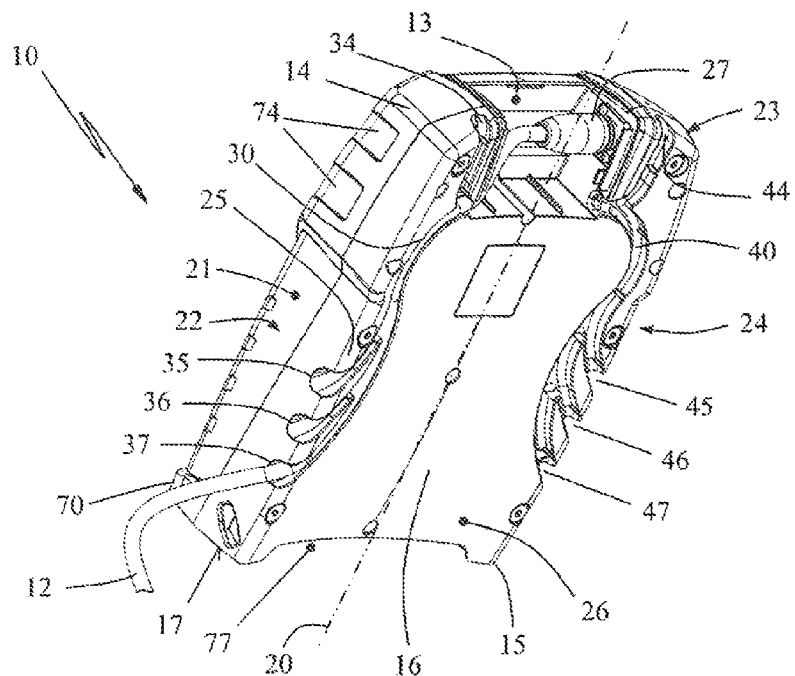
FIG. 3 shows a perspective view of the rechargeable battery pack according to FIG. 2.

The back panel 16 is, as shown in FIG. 3, slightly curved in relation to the housing interior and forms an anatomically adjusted support for the back of a user. The back panel 16 is completely closed in the direction of the user, that is to say does not have any apertures or openings for cooling air or the like.

The back panel 16 has an approximately rectangular basic shape, the longitudinal center axis 20 thereof being perpendicular to the base 17 and forming a vertical normal axis.

Figure 4:
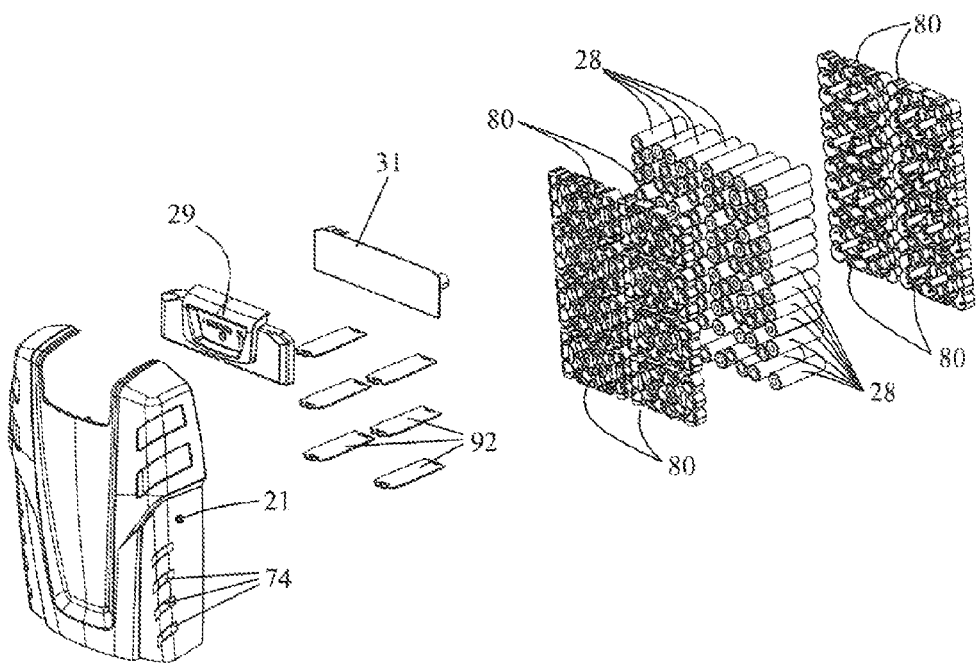
FIG. 4 shows a partially exploded illustration of the rechargeable battery pack according to FIG. 2.
Figure 5:
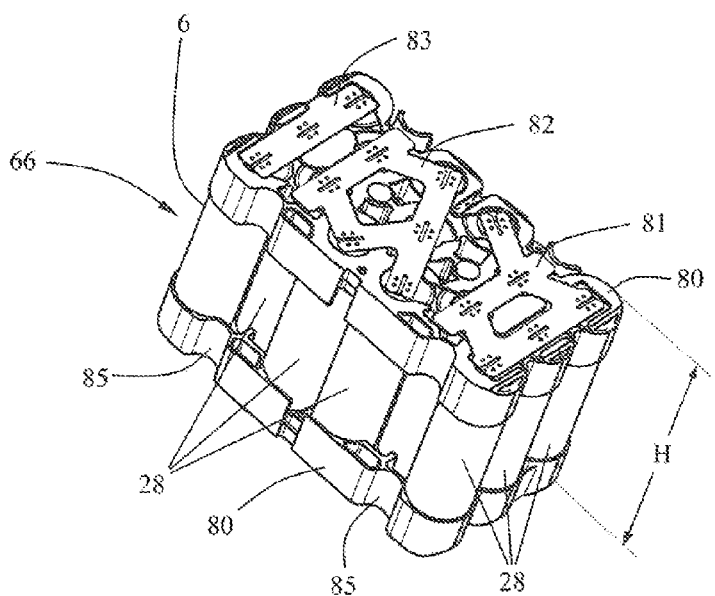
FIG. 5 shows a perspective illustration of a view of a cell pack.
Figure 6:
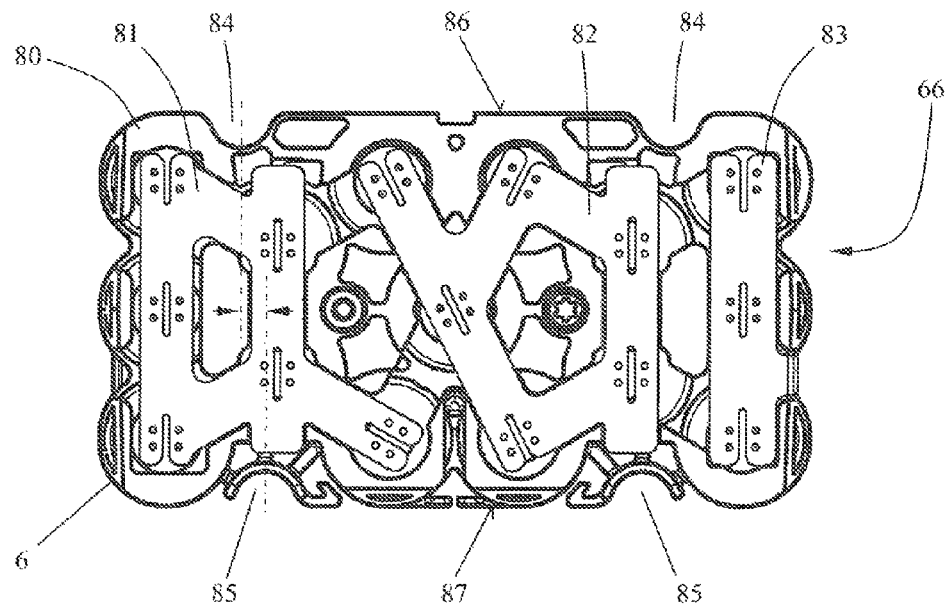
FIG. 6 shows a plan view of the cell pack according to FIG. 5.

As shown, in FIG. 4, the rechargeable battery pack 10 includes a large number of individual cells 28 which—see FIGS. 5 and 6—are assembled to form cuboidal cell packs 6.

In the exemplary embodiment, a cell pack 6 includes, in principle, fifteen individual cells 28 which are electrically connected to one another by means of cell connectors 81, 82 and 83. The individual cells 28 can be connected to one another in parallel and/or in series within a cell pack 6.

The minimum requirement to form a cell pack 6 is one individual cell 28; the maximum number of cells in the arrangement, shown according to FIGS. 5 and 6 is fifteen.

As shown in FIGS. 5 and 6, the individual cells 28 are held at their ends in cell supports 80 which mechanically fix the individual cells 28 relative to one another. A manageable independent unit 66 is produced after arrangement of the cell connectors 81, 82 and 83.

Each cell pack 6 has a semi-cylindrical cutout (84, 85) on its longitudinal side (86, 87), with the cutout 84 on one longitudinal side 85 of the cell pack 6 being offset in relation to the cutouts 85 on the other longitudinal side 87 of the cell pack 6.

The vertical sides 22 and 24 which extend parallel to the longitudinal center axis 20 form first narrow sides of the housing 14; the vertical sides 22 and 24 are connected to one another by means of the base 17 at one end and by means of an upper narrow side 23 at the other end. A first edge 25 of the housing 14 is formed, between the back panel 16 and the narrow sides (vertical sides (22, 24), upper narrow side 23 and base 17), the edge also being referred to as the housing edge in the text which follows.

In order to allow the user to guide the cable in a freely selectable, ergonomically suitable manner, cable ducts (30, 40) (FIG. 3) are formed in a housing wall of the housing 14, in the back panel 15 in the exemplary embodiment, the cable ducts advantageously being designed as open, U-shaped grooves. The cable ducts (30, 40) are laid such that they are substantially completely recessed in the back panel 16, that is to say in an installation space between the outer face 26 of the back panel 16 and the cell pack 6 which is arranged in the housing 14. Each U-shaped groove is designed to be open to the outer face 26 of the back panel 16 essentially over their entire length, and therefore a connection cable 12 can be easily inserted into the cable duct (30, 40) from the outer face 26.

Cable ducts (30, 40) open, in the edge 25 of the housing 14 as cable outlets 34 to 37 and 44 to 47, respectively, with a plurality of cable outlets 34 to 37 and 44 to 47 being provided in the peripheral direction of the housing edge 25. Each cable duct (30, 40) runs out of the terminal, box 13 as far as the particular cable outlet in the back panel 16 in a recessed manner. In this case, the arrangement is provided such that cable outlets 34 to 37 and cable outlets 44 to 47 are provided on respective sides of the vertical longitudinal center axis 20.

The terminal box 13 is—see FIG. 1—closed by a cover 19 and completely accommodates the connection plug 27 of the connection cable 12. Furthermore, an electronics system 31 (FIG. 4), which is provided for monitoring ore for displaying the capacity of the rechargeable battery pack 10, can be arranged in the terminal box 13. A monitoring electronics system is practical particularly when the rechargeable battery pack 10 includes lithium-ion cells or similar chemically lithium-based individual cells 28. In order to display the state of charge of the rechargeable battery pack 10, a bar-like state of charge indicator 23 is provided in the housing cover 21, the state of charge indicator being level with the terminal box 13. In this way, the corresponding electronics system 31 can be arranged, close to the state of charge indicator 29 in the terminal box 13. The indicator can also be in the form of a display, for example an LCD display, and be made up of individual optical indicators, for example LEDs, or else include an acoustic indicator in order to provide an audible warning when, for example, the remaining capacity of the rechargeable battery pack falls below a predefined threshold value.

Figure 7:
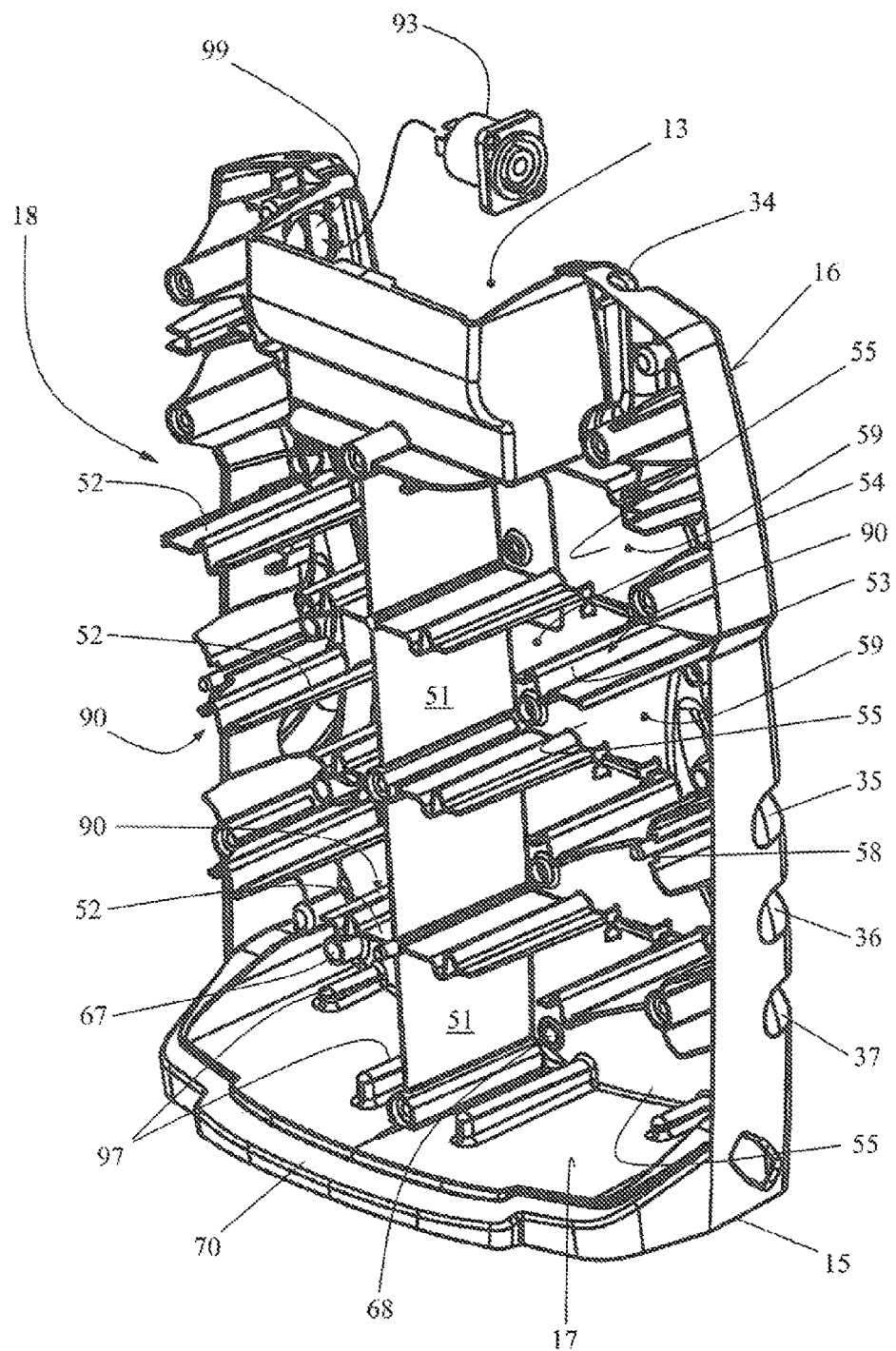
FIG. 7 shows a perspective view of the open main body of the housing of the rechargeable battery pack according to FIG. 2.
Figure 8:
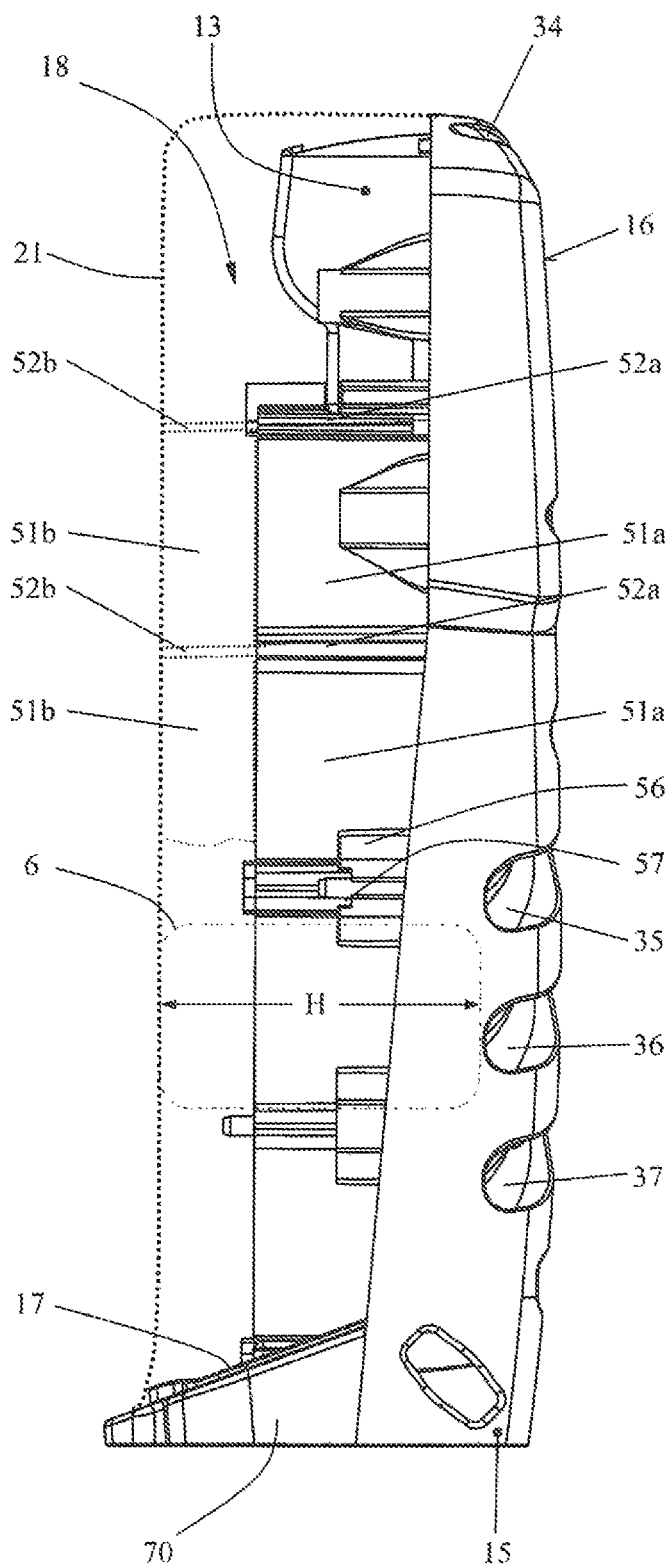
FIG. 8 shows a side view of the main body according to FIG. 7.
Figure 9:
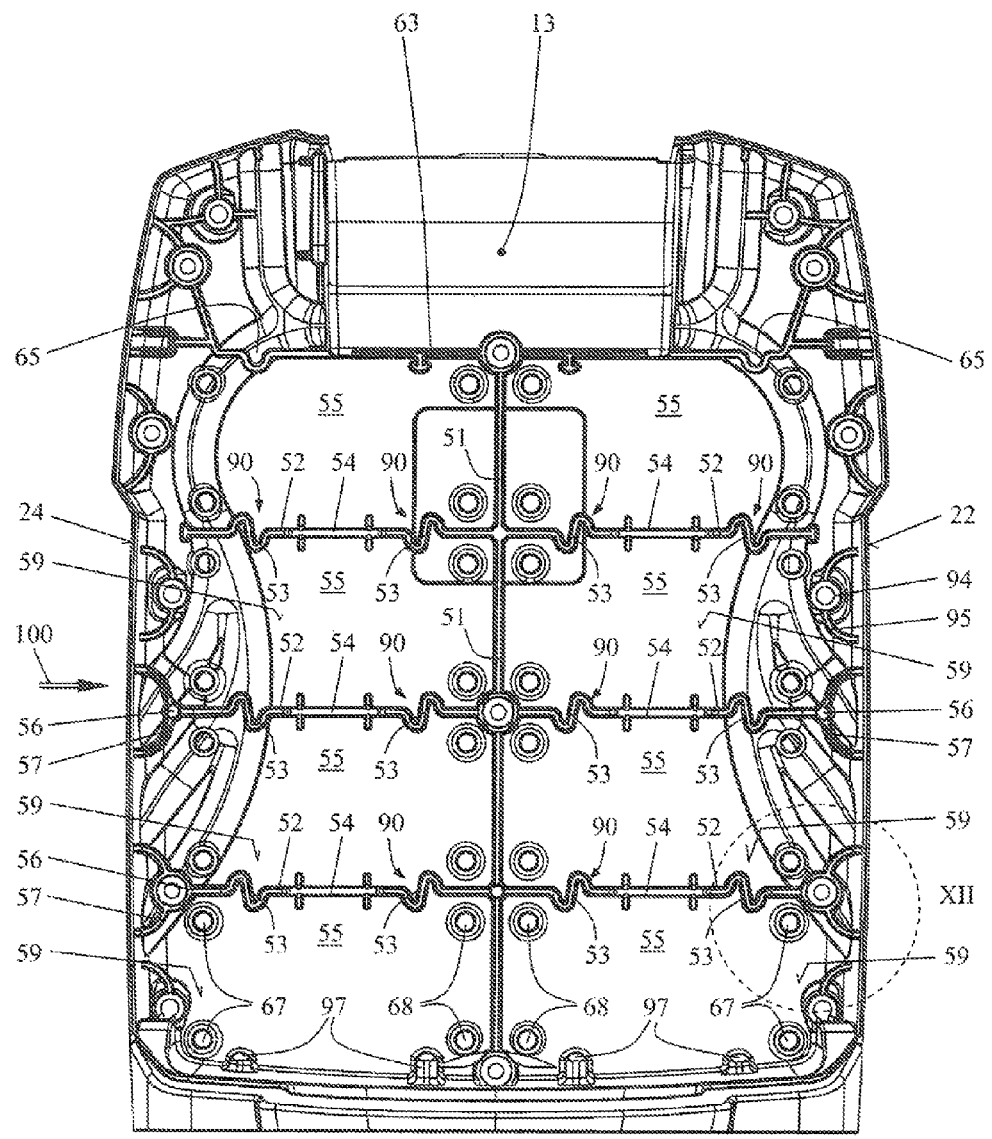
FIG. 9 shows a plan view of an open receiving space of the main body according to FIG. 7.

A receiving space 18, which serves to accommodate cell packs 6, is formed, between the housing cover 21 and the L-shaped main body 15. FIGS. 7 to 9 show how the receiving space 18 is subdivided into individual receptacles 55 by partition walls (51, 52). The wall 51 runs approximately parallel to the vertical sides (22, 24) and the walls 52 run parallel to the upper narrow side 23 and the base 17. In the exemplary embodiment shown, the receiving space 18 is partitioned in the center by a vertical partition wall 51, the partition wall 51 running approximately with the longitudinal center axis 20 of the back panel 16 for this purpose. The two halves of the receiving space 18 in the main body 15 are subdivided into, in each case, four individual receptacles 55 by partition walls 52 which are orthogonal to the main panel. In the exemplary embodiment shown, the receiving space 18 is subdivided in such a way that the individual receptacles 55 are of the same size and each serve to accommodate a cell pack (FIGS. 10, 11) having the same dimensions.

As illustrated in FIG. 8, the partition wall 51 is composed of a first vertical section 51a which is formed on the main panel (back panel 16) and a second vertical section 51b which is formed in the housing cover 21. Accordingly, a horizontal partition wall 52 is composed of a vertical section 52a which is connected to the back panel 15 and a vertical section 52b which is connected to the housing cover 21. Therefore, the partition walls 51 and 52 each extend substantially over the entire height H of a cell block 6 (FIG. 8). As shown in FIGS. 7 and 9, the receiving space is subdivided into eight individual receptacles 55 with supports (67, 68) for the cell block 6 being provided on the base 59 of each individual receptacle. As shown in FIG. 7, the supports have different heights; as a result, the cell block 6 is guaranteed to be supported so as to be flat in an individual receptacle 55 in spite of the curved back panel 16 and the resulting curved base 59. The supports 67 which are situated close to the vertical sides 22 and 24 have a greater height, in order to compensate for the curvature, than the supports 68 which are provided close to the central, vertical partition wall 51.

The partition wails 51 and 52 are in the form of ribs and extend from one narrow side of the housing 14 to the opposite narrow side of said housing. The vertical partition wall 51 extends from the base 17 of the L-shaped main body 15 as far as the base 63 of the terminal box 13; the partition, wail 51 therefore acts like a reinforcing, vertical strut.

Accordingly, the partition walls 52 connect one vertical side 22 of the housing 14 to the opposite vertical side 24 of the housing. In the region of intersection with the partition wall 51, the partition walls 52 are integrally formed with the partition wall 51 and thereby form a cross brace for the housing 14 of the rechargeable battery pack 10.

In order to be able to absorb the forces acting on the housing 14 without being destroyed and to pass on said forces, provision is made for an elastic deformation zone 90 to be formed in the longitudinal direction of a partition wall, the partition wall 52 in the exemplary embodiment, this deformation zone yielding elastically under the action of a force 100 (FIG. 9). In the exemplary embodiment shown, the deformation zone 90 of the partition wall includes a corrugated or S-shaped wall section 53. As shown in FIGS. 7 and 9, the corrugated wall section 53 extends over the entire height of the partition wall 52, that is, is formed both in the vertical section 52a of the main body and in the vertical section 52b of the housing cover 21. In plan view, the wall section 53 corresponds approximately to a full wave, for example a sinusoidal wave, or is in the form of an S.

In order to not conduct a force 100 acting, for example, on the narrow vertical side 24 as far as the narrow vertical side 22 via the horizontal partition wall 52, provision is made to interrupt the partition wall between its ends 56. In the embodiment shown, the partition wall 52 is interrupted at each individual receptacle 55, for example, with a cutout 54.

The cutout 54 also extends over the two vertical sections 52a and 52b, that is, the cutout 54 is provided partly in the partition wall section of the main body 15 and partly in the partition wall section of the housing cover 21.

Figure 10:
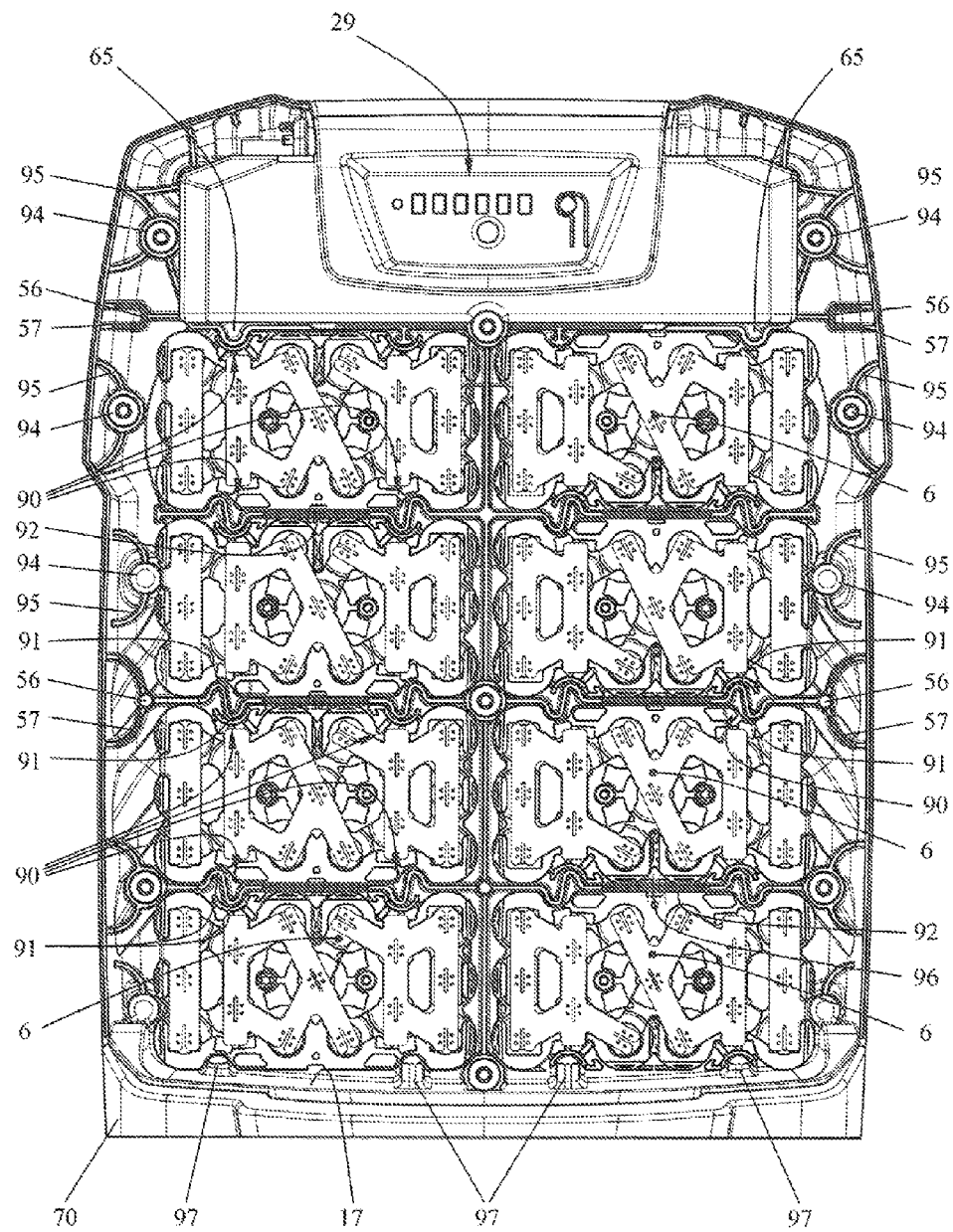
FIG. 10 shows a plan view of the main body according to FIG. 7 with a cell pack arranged in the receiving space.

The cutouts 54 can be closed by slides 92, so that all the individual receptacles can be mechanically separated from one another. The cutouts 54 can be used to guide electrical lines in order to then—with the electrical lines laid—insert the slides 92 into the cutouts. The slides 92 can be designed such that they hold the electrical wiring 96 (FIG. 10).

In order to make the arrangement more elastic for the purpose of achieving internal flexibility, provision is made to not connect the ends 56 of a partition wall 52 directly to the vertical sides 22 and 24, but rather to connect them to the side walls of the housing 14 by means of a connection section 57, with the connection section 57 being of elastic design. In the exemplary embodiment shown, the connection section is of arcuate design, in particular partially cylindrical, in section, as illustrated in FIG. 9 and also FIGS. 12 and 13. The end 56 of the partition wall is connected to the connection section 57 approximately in the center; the connection section 57 is symmetrical in relation to the partition wall.

The screw bosses 94, which are situated adjacent to the vertical sides 22 and 24 within the housing 14, are advantageously also connected to the side walls of the housing 14 by elastic connecting sections 95, with a symmetrical design being advantageous.

In order to guide electrical cables in the region of the vertical sides in a simple manner, cutouts 58 are formed in the connecting sections 57 and cutouts 98 are formed in the connecting sections 95.

Figure 11:
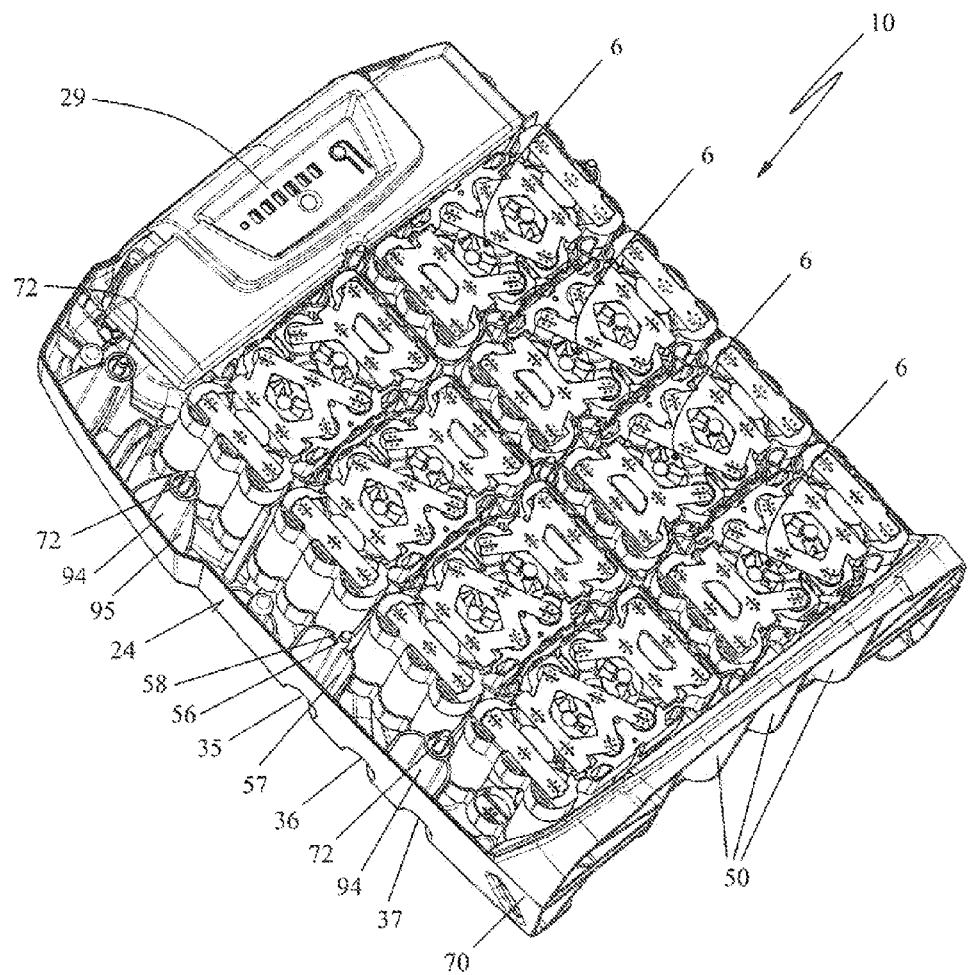
FIG. 11 shows a perspective illustration of the main body according to FIG. 10.
Figure 12:
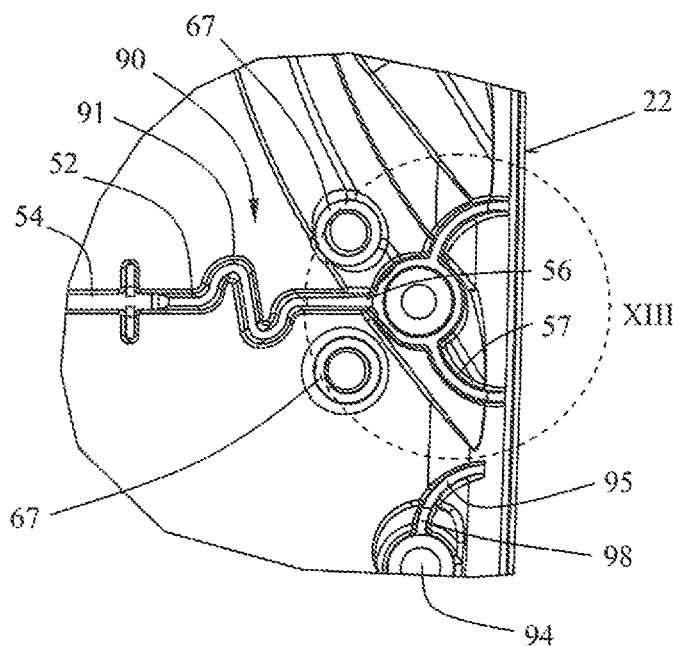
FIG. 12 shows an enlarged illustration of detail XII in FIG. 9.
Figure 13:
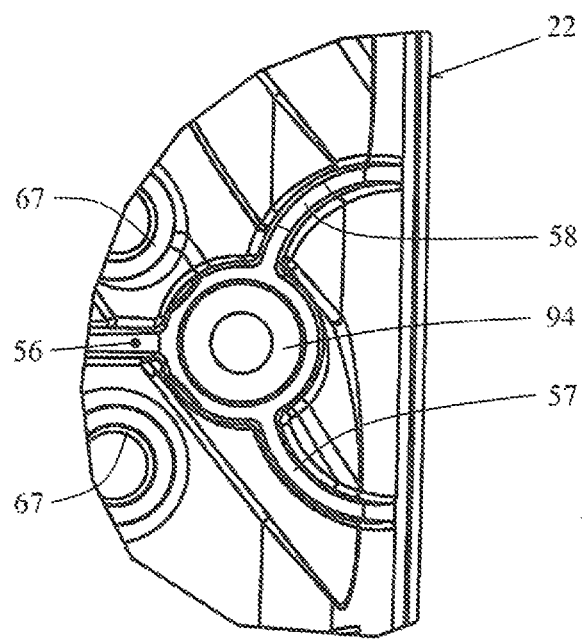
FIG. 13 shows the enlarged detail XIII in FIG. 12.

The cell packs 6 are inserted into the individual receptacles 55 designed in this way, as shown in FIGS. 10 and 11. The corrugated sections 91 of the deformation zone 90 advantageously project into the individual receptacles 55, with the corrugated sections coming to rest in the cutouts 84 and 85 in the cell pack 6 when the cell pack 6 is inserted. As a result, each cell pack 6 is accommodated physically separately from the other cell packs 6 in the individual receptacle 55 and is secured in its position in the individual receptacle 55 by the corrugated sections 91 which form engagement elements. In order to ensure that the cell pack 6 is effectively fixed on both sides in the individual receptacles adjoining the base 17 and the bass 63, beads 97 are formed in the base 17 and beads 65 are formed in the base 63. The beads project into the corresponding individual receptacles in a manner corresponding to the corrugated sections 91 as engagement elements. In this way, a cell pack 6 is fixed in an individual receptacle 55 such that it cannot move, it being possible for a distance, in particular a distance all the way around, to be provided between the cell pack 6 and the walls of the individual receptacle 55.

Figure 2:
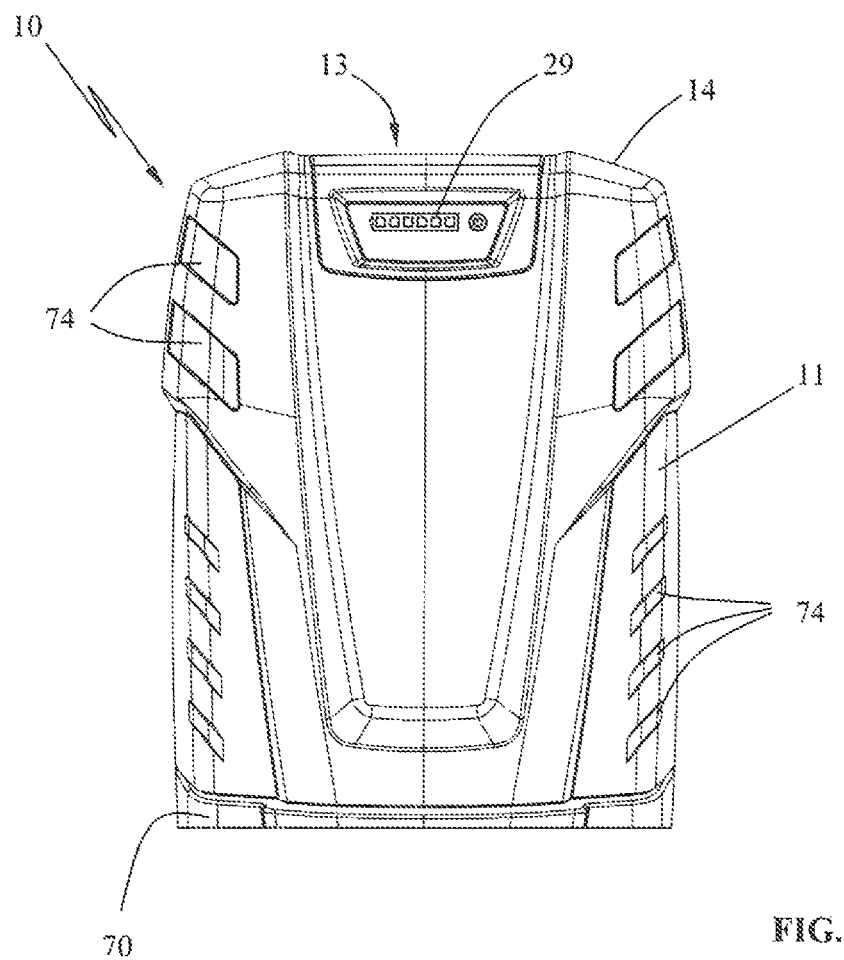
FIG. 2 shows a view of a visible area of the rechargeable battery pack.

In order to design the housing cover 21 to firstly be lightweight but secondly to ensure a sufficient degree of stability, provision is made to form thickened portions 74 in the region of the screw boss for engagement of the fastening screws 72. These thickened portions act as braces and are—as shown in FIG. 2—of approximately rectangular design and, at the same time, used as design elements. The thickened portions 74 are each situated in the region, of the screw bosses 94.

The terminal box 13 which is provided in the rechargeable battery pack is integrally formed with the housing 14. The terminal box 13 is situated opposite the base 17, that is, at the other end of the housing 14, and therefore the cell packs 6 axe situated, directly in the region of the base 17. As a result, a lower center of gravity of the entire rechargeable battery pack 10 can be ensured.

In order to make carrying the rechargeable battery pack 10 more comfortable for a user, provision is made to form an indentation 77 in the base region of the back panel 16. The indentation 77 extends substantially over the height of the rib arrangement 50 of the base 17 which is in the form of a stand 70.

It is understood that the foregoing description is that of the preferred embodiments of the invention and that various changes and modifications may be made thereto without departing from the spirit and scope of the invention as defined in the appended claims.

What is claimed is:

1. A rechargeable battery pack for an electric load comprising:
   a connecting cable;
   a multiplicity of rechargeable individual cells which are electrically interconnected and configured to feed the electric load via said connecting cable;
   a housing having a receiving space configured for accommodating said multiplicity of cells;
   partition walls configured to subdivide said receiving space into individual receptacles;
   said multiplicity of individual cells being apportioned into a plurality of cell packs wherein each one of said cell packs contains a predetermined number of said individual cells;
   said cell packs defining respective independent components configured to be held in corresponding ones of said receptacles;
   a plurality of cell connectors assigned to corresponding ones of said cell packs for interconnecting the cells of the cell pack corresponding thereto;
   each of said cell packs having a height (H);
   said partition walls of said individual receptacles extending over approximately all of said total height (H);
   said partition walls in said housing being configured as ribs;
   said housing having mutually adjacent vertical sides; and,
   said partition walls extending from one of said mutually adjacent vertical sides to the other one of said mutually adjacent vertical sides.

2. The rechargeable battery pack of claim 1, wherein each one of said cell packs has an outer contour; and, said housing has engagement elements configured to engage into the outer contour of each one of said cell packs so as to secure the cell pack in the receptacle corresponding thereto.

3. The rechargeable battery pack of claim 1, wherein said housing has a main body; and, said receptacles are formed in said main body.

4. The rechargeable battery pack of claim 1, wherein said housing includes a back plate; and, said receptacles are formed on said back plate.

5. The rechargeable battery pack of claim 3, wherein said housing includes a main plate, a base, and a housing cover; said main plate and said base conjointly define the shape of said main body of said housing as an L-shape which delimits said receiving space; and, said housing cover is configured to close said receiving space.

6. The rechargeable battery pack of claim 5, wherein each one of said partition walls is conjointly defined by a first elevation section configured on said main plate and a second elevation section configured on said housing cover.

7. The rechargeable battery pack of claim 1, wherein each one of said receptacles has a base and supports provided on said base configured to hold the cell pack in said one receptacle in an aligned manner.

8. The rechargeable battery pack of claim 7, wherein said one cell pack is held at approximately the same distance to each of the partition walls defining the receptacle corresponding to said one cell pack.

9. The rechargeable battery pack of claim 1, wherein each one of said partition walls defines a longitudinal direction; and, at least one of said partition walls has an elastic deformation zone in said longitudinal direction thereof.

10. The rechargeable battery pack of claim 9, wherein said elastic deformation zone comprises a wall section of said one partition wall which is wave-shaped to s-shaped.

11. The rechargeable battery pack of claim 10, wherein each one of said cell packs has an outer contour with a plurality of recesses formed therein; said housing has engagement elements configured to engage into said recesses of said outer contour of each one of said cell packs so as to secure said cell pack in said receptacle; and, said engagement elements are formed by said wave-shaped wall section of said deformation zone.

12. The rechargeable battery pack of claim 11, wherein each one of said cell packs has a first and a second longitudinal side; and, a plurality of said recesses are arranged on said first longitudinal side so as to be offset from a plurality of said recesses arranged on said second longitudinal side.

13. The rechargeable battery pack of claim 1, wherein said housing has first and second upwardly-directed sides; at least one of said partition walls runs from said first upwardly-directed side to said second upwardly-directed side; and, said partition wall includes an interruption.

14. The rechargeable battery pack of claim 13, wherein at least one of said partition walls has an interruption at the elevation of each of said receptacles; and, said interruptions are formed by respective cutouts in said one partition wall.

15. The rechargeable battery pack of claim 14, wherein said cell packs have wiring running between each other; and, slides are configured to close corresponding ones of said cutouts and hold said wiring.

16. The rechargeable battery pack of claim 1, wherein said housing has a narrow side; at least one of said partition walls has an arch-shaped connecting section which is partially cylindrical in cross-section; and, said one partition wall is connected to said narrow side of said housing via said connecting section.

17. The rechargeable battery pack of claim 16, wherein the partially cylindrical connecting section defines an edge having cutouts configured therein for guiding cables.

18. The rechargeable battery pack of claim 1, wherein said housing has an outer side; and, said outer side has partially thickened portions configured as reinforcement.

19. The rechargeable battery pack of claim 1,
wherein said housing includes a housing cover; and, said housing cover has partially thickened portions configured as reinforcement.

20. The rechargeable battery pack of claim 1 further comprising an electrical terminal box arranged in said housing.

21. The rechargeable battery pack of claim 20, wherein said housing includes a main plate; and, said electrical terminal box is arranged recessed in said main plate.

22. The rechargeable battery pack of claim 21, wherein said housing has a base and an upper narrow side; said main plate has an upper end region; and, said electrical terminal box is arranged in said upper end region of said main plate below said upper narrow side.

23. The rechargeable battery pack of claim 1, wherein said cell packs are interconnected via at least one of signal lines and energy lines.

* * * * *

UNITED STATES PATENT AND TRADEMARK OFFICE
CERTIFICATE OF CORRECTION

PATENT NO. : 8,968,913 B2  
APPLICATION NO. : 13/726363  
DATED : March 3, 2015  
INVENTOR(S) : H. Rosskamp et al.

Page 1 of 1

It is certified that error appears in the above-identified patent and that said Letters Patent is hereby corrected as shown below:

In the Specification

In column 4:  
Line 7: delete "OP" and substitute -- OF -- therefor.

In column 5:  
Line 6: delete "side 85" and substitute -- side 86 -- therefor.  
Line 21: delete "panel 15" and substitute -- panel 16 -- therefor.  
Line 44: delete "ore" and substitute -- or -- therefor.  
Line 51: delete "indicator 23" and substitute -- indicator 29 -- therefor.

In column 6:  
Line 18: delete "panel 15" and substitute -- panel 16 -- therefor.  
Line 33: delete "wails" and substitute -- walls -- therefor.  
Line 37: delete "partition, wail" and substitute -- partition wall -- therefor.

In column 7:  
Line 42: delete "bass" and substitute -- base -- therefor.  
Line 61: delete "axe" and substitute -- are -- therefor.

Signed and Sealed this  
Eighteenth Day of August, 2015

Michelle K. Lee  
*Director of the United States Patent and Trademark Office*